US009589332B2

(12) United States Patent
Daniels et al.

(10) Patent No.: US 9,589,332 B2
(45) Date of Patent: Mar. 7, 2017

(54) CAMERA MOVEMENT CORRECTION APPARATUS, METHOD AND SYSTEM

(71) Applicants: SONY CORPORATION, Tokyo (JP); SONY EUROPE LIMITED, Brooklands (GB)

(72) Inventors: Anthony Daniels, Winchester (GB); Paul Hawkins, Shawford (GB)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 504 days.

(21) Appl. No.: 13/667,601

(22) Filed: Nov. 2, 2012

(65) Prior Publication Data

US 2013/0120582 A1   May 16, 2013

(30) Foreign Application Priority Data

Nov. 11, 2011 (GB) .................................. 1119484.2

(51) Int. Cl.
*H04N 5/228* (2006.01)
*G06T 5/00* (2006.01)

(52) U.S. Cl.
CPC .... *G06T 5/006* (2013.01); *G06T 2207/30204* (2013.01); *G06T 2207/30228* (2013.01)

(58) Field of Classification Search
CPC ...................................................... H04N 5/228
USPC ......................................................... 348/157
IPC ........................................................ H04N 5/228
See application file for complete search history.

(56) References Cited

U.S. PATENT DOCUMENTS

| | | | |
|---|---|---|---|
| 4,470,151 A | 9/1984 | Billingsley et al. | |
| 2002/0145677 A1* | 10/2002 | Ryan et al. | 348/373 |
| 2006/0004280 A1* | 1/2006 | Kotake et al. | 600/414 |
| 2008/0292131 A1* | 11/2008 | Takemoto et al. | 382/100 |
| 2009/0028439 A1* | 1/2009 | Elangovan | G06K 9/6202 382/209 |
| 2010/0105503 A1* | 4/2010 | Daisher et al. | 473/467 |
| 2011/0090344 A1* | 4/2011 | Gefen et al. | 348/169 |

FOREIGN PATENT DOCUMENTS

| | | |
|---|---|---|
| EP | 2 247 097 A2 | 11/2010 |
| FR | 2 863 750 A1 | 6/2005 |

OTHER PUBLICATIONS

U.S. Appl. No. 13/667,524, filed Nov. 2, 2012, Daniels, et al.
U.S. Appl. No. 13/671,236, filed Nov. 7, 2012, Daniels, et al.
United Kingdom Search Report Issued Mar. 12, 2012, in Great Britain Patent Application No. 1119484.2, filed Nov. 11, 2011.

* cited by examiner

*Primary Examiner* — Yulin Sun
(74) *Attorney, Agent, or Firm* — Oblon, McClelland, Maier & Neustadt, L.L.P.

(57) ABSTRACT

A camera movement correction apparatus for use in a system which detects the position of a sporting projectile within a scene, the apparatus comprising: an interface operable to receive a first and second image of the scene captured by a camera; a reference marker determiner operable to determine the position of a reference marker within the first and second image of the scene, the reference marker being static within the scene; a difference determination device operable to determine the difference between the position of the reference marker in the first and second image of the scene; and a corrective transformer operable to apply a corrective transform to the second image on the basis of said determined difference.

19 Claims, 9 Drawing Sheets

CAMERA MOVEMENT CORRECTION APPARATUS, METHOD AND SYSTEM

CROSS REFERENCE TO RELATED APPLICATION

The present application claims the benefit of the earlier filing date of GB1119484.2 filed in the United Kingdom Patent Office on 11 Nov. 2011, the entire content of which application is incorporated herein by reference.

BACKGROUND

Field of Disclosure

The present invention relates to an apparatus, method and system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In ball sports such as football, it is important to know when a goal has been scored. A goal is usually counted when the whole of the ball crosses the whole of a predetermined goal line. Match officials have the job of watching the ball and judging whether or not the ball has crossed the goal line and hence whether or not a goal has been scored. Such a system, however, although well established, can be quite unreliable. If the view of the match officials is obscured, or if one of the match officials makes an error, crucial game decisions can be made incorrectly. There is therefore a desire to implement camera and/or computer based technology to determine whether or not a ball has crossed a line so as to aid the match officials in making such decisions.

One proposal for such technology involves fitting the match ball with a sensor which may be detected by a number of detection units in such a way that the position of the ball at any one time may be computed. The sensor could, for example, emit radio frequency (RF) pulses that are picked up by the detection units at periodic intervals, with the time taken for the pulse to reach each detection unit indicating the distance of the ball from that sensor. One problem with this approach, however, is that the sensor within the ball is likely to noticeably change the weight and/or balance of the ball, which is highly undesirable. Quality control is also difficult, since it is possible for the ball to be tampered with (in the case that, for example, the ball is kicked into a crowd of spectators) so as to alter the characteristics of the sensor.

Another proposal involves fitting sensors to the two goal posts, where one goal post is placed at each end of the goal line. The sensors are then configured to detect the presence of objects that appear between them (via laser technology, for example) and can thus detect the presence of objects that cross the goal line. This system is quite unreliable, however, since it is difficult to differentiate between the ball crossing the goal line and other objects crossing the goal line (such as the football players themselves). Also, the goal posts to which the sensors are attached may experience significant movement during a football match and, further, may not be fully lined up with the goal line itself, reducing the reliability and accuracy of the system.

The present invention aims to alleviate these problems.

SUMMARY

It is to be understood that both the foregoing general description of the invention and the following detailed description are exemplary, but are not restrictive, of the invention.

According to one aspect, there is provided a camera movement correction apparatus for use in a system which detects the position of a sporting projectile within a scene, the apparatus comprising: an interface operable to receive a first and second image of the scene captured by a camera; a reference marker determiner operable to determine the position of a reference marker within the first and second image of the scene, the reference marker being static within the scene; a difference determination device operable to determine the difference between the position of the reference marker in the first and second image of the scene; and a corrective transformer operable to apply a corrective transform to the second image on the basis of said determined difference.

This is advantageous because the camera capturing the image will move over time due to external factors such as wind and the correction of the image in accordance with the reference marker means that such movements may be corrected.

According to another aspect, there is provided a system for detecting the position of a ball within a scene, the system comprising: the camera movement correction apparatus according to the above aspect; a camera operable to capture a first and second image of a scene and provide the first and second images of the scene to the camera movement apparatus; and a reference marker positioned within the scene within the camera's field of view, the reference marker being stationary within the scene.

The reference marker may be configured to be seen from a substantially frontal perspective within the field of view of the camera.

At least a portion of the reference marker may be reflective.

The scene may comprise a goal post and in which the reference marker is placed on the goal post close to the end of the goal post which is in contact with the ground.

The scene may comprise a goal net holder and in which the reference marker is placed on the goal net holder at a predetermined height above the ground.

The system may further comprise a casing around the camera, the casing configured to deflect wind from the camera.

According to another aspect, there is provided a camera movement correction method when capturing a scene in which the position of a sporting projectile is to be determined, the method comprising: receiving a first and second image of the scene captured by a camera; determining the position of a reference marker within the first and second image of the scene, the reference marker being static within the scene; determining the difference between the position of the reference marker in the first and second image of the scene; and applying a corrective transform to the second image on the basis of said determined difference.

The method may further comprise; capturing a first and second image of a scene and providing the first and second images of the scene to the camera movement apparatus; and positioning within the scene within the camera's field of view the reference marker, wherein the reference marker is stationary within the scene.

The reference marker may be configured to be seen from a substantially frontal perspective within the field of view of the camera.

At least a portion of the reference marker may be reflective.

The scene may comprise a goal post and in which the reference marker is placed on the goal post close to the end of the goal post which is in contact with the ground.

The scene may comprise a goal net holder and in which the reference marker is placed on the goal net holder at a predetermined height above the ground.

A casing may be provided around the camera, the casing configured to deflect wind from the camera.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
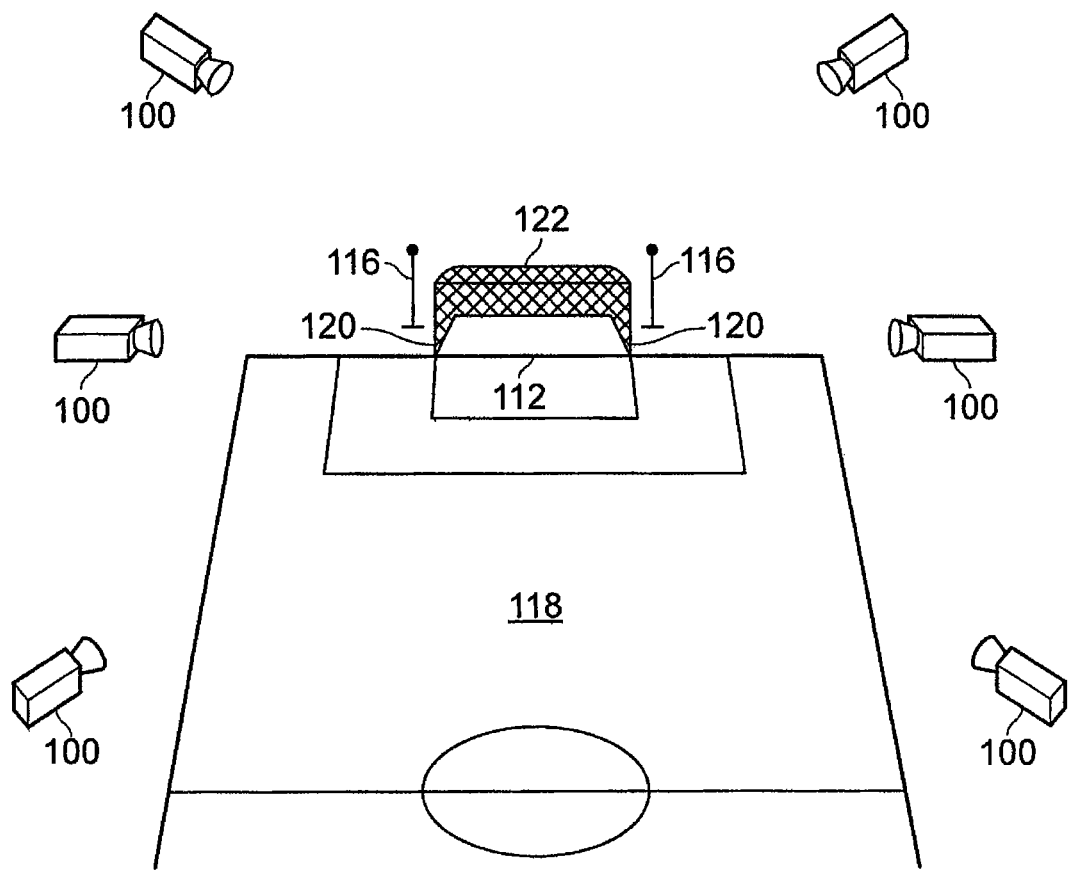
FIG. 1A schematically illustrates the positions of a plurality of cameras with respect to a goal line of a football pitch in accordance with an embodiment of the invention.
Figure 1B:
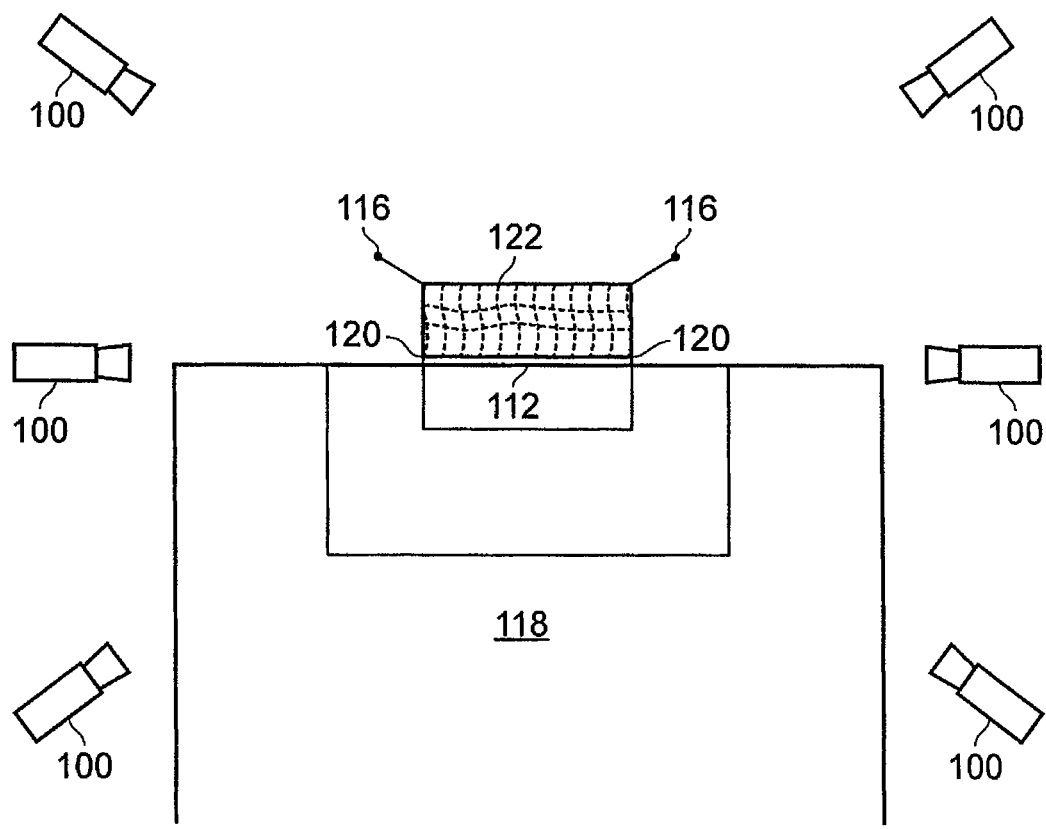
FIG. 1B schematically illustrates the cameras and goal line of FIG. 1B from as viewed from a different perspective.

FIGS. 1A and 1B illustrate the positions of a plurality of cameras 100 arranged about a goal line 112 on a football pitch 118. Each of the cameras is configured to capture images of substantially the same scene from different fields of view, the scene including the goal line 112 and the whole of the goal 122. In this embodiment, two cameras 100 are placed behind the goal line, two cameras 100 are placed in line with the goal line and two cameras 100 are placed in front of the goal line. When a game is in play, the cameras are thus operable to capture images of the scene when the ball is in close proximity to the goal line.

In one embodiment, the cameras 100 are positioned a long way from the goal line so that the size of the ball in the captured images of the scene does not appear to change significantly. For example, each of the cameras may be positioned approximately 50 meters from the goal line. This is advantageous because if the size of the ball does not appear to change significantly within the field of view of each camera, then image processing techniques for detecting the ball within the captured images, such as block matching techniques, can occur with greater efficiency. This is because the model of the ball used in the block matching technique will require only limited scaling.

Although the cameras 100 may be positioned at any height with respect to the football pitch, in embodiments the cameras are positioned such that objects other than the ball (such as spectators at the side of the pitch) are less likely to obstruct the camera's view. For example, where the cameras 100 are located in a stadium, the cameras 100 may be located in the canopy covering the crowd.

Further, in embodiments, although six cameras are shown, a different number of cameras could be used. If the number of cameras is reduced, however, it may become more difficult to accurately detect the position of the ball in the case that the view of one or more of the cameras becomes obscured.

The cameras are positioned so that predetermined camera calibration reference markers are clearly within the view of each camera. As will be described later, these reference markers are necessary for detecting and correcting for movement of the cameras. In one embodiment, the reference markers are located on the goal net holders 116 and on the goal posts 120. By positioning the reference markers in these locations, the likelihood of these points moving within the scene is very small. Additionally, by placing the reference markers near or at the top of the goal net holder 116, the likelihood of these reference markers being obscured is reduced.

In order to reduce the likelihood of wind moving the cameras (in the case of an outdoor football stadium, for example), the cameras should be positioned in a sheltered location. The cameras may also comprise an aerodynamically designed casing so that movement due to the wind may be further reduced.

Figure 2:
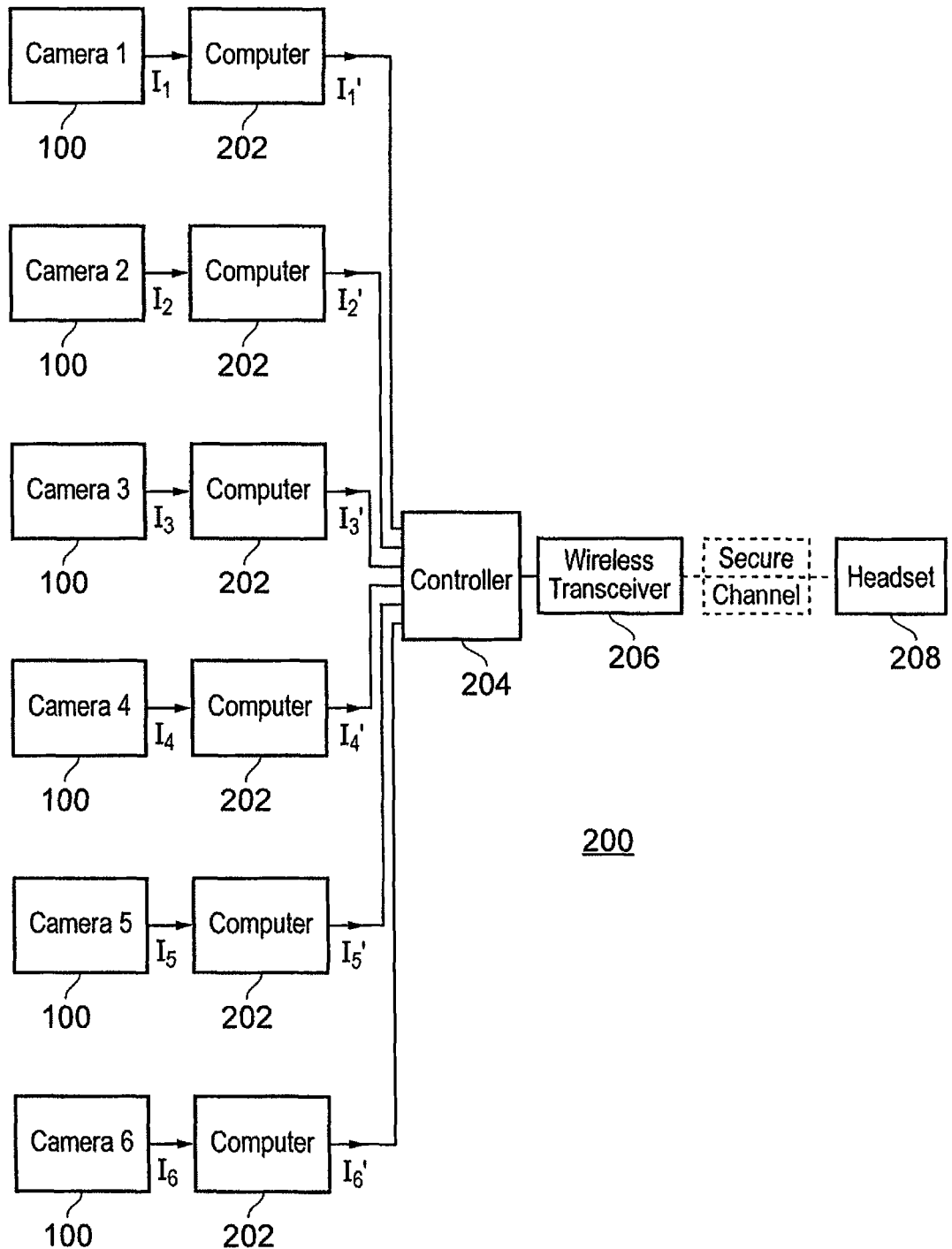
FIG. 2 schematically illustrates a system for detecting the position of a ball within a scene in accordance with an embodiment of the invention.

FIG. 2 schematically illustrates a system 200 for detecting the position of a ball within a scene in accordance with an embodiment of the invention. Each camera 100 is operable to capture an image of the scene from a different field of view. As can be seen in FIG. 2, each of the images I1-I6 from respective cameras 1-6 is then passed to a camera calibration computer 202.

The camera calibration computer 202 is operable to detect at least one of the camera calibration reference markers 402 in the captured image and compare the position of the reference marker with its position in a previous image. In the scene itself, as will be explained later, the reference marker will be stationary, so any difference in the position of the reference marker between the current and previous images indicates that the camera itself has experienced movement (for example, pan, tilt or roll). In the case that movement of the position of the reference marker is detected, the camera calibration computer 202 is operable to apply a corrective transform to the received image so as to correct for the movement of the camera. In other words, all the pixels in the image have the corrective transform applied to them. This counters any movement of the pixels in the image due to movement of the camera.

Any methods well known in the art for detecting a difference in the position of a reference marker between a first and second image and subsequently transforming the second image to offset the difference may be used. One such technique is to apply a transformation matrix which allows the relevant calibration variables to be adjusted to best fit the pixel difference between the first and second image. Once image processing by each of the camera calibration computers 202 is completed, the corrected captured images I1'-I6' are passed on to the controller 204.

The controller 204 is operable to accurately determine the position of the ball within the scene from the corrected captured images I1'-I6'. As will be explained later, the controller 204 achieves this by processing each of the images I1'-I6' so as to detect position and orientation data for the ball within each image. The controller 204 then combines the position and orientation data for each image and uses the resulting combined data, together with the known relative positions of each camera 100, to determine the position of the ball within the scene. The controller 204 is also operable to determine the trajectory of the ball within the scene during time intervals in which the ball is hidden from the view of all cameras (for example, when a large number of players are close to the goal line and are hence likely to intermittently hide the ball from the view of all cameras). As will be explained later, it achieves this by using position, velocity and impact characteristic data for the ball immediately before and immediately after the time interval over which the ball is hidden.

When the position of the ball within the scene has been determined by the controller 204, either directly from the captured images I1'-I6' (in the case that at least a part of the ball is sufficiently visible to the cameras 100) or by the ball trajectory detection mechanism (in the case that the ball is hidden), the controller 204 determines whether or not the whole of the ball has crossed the whole of the goal line. This will be determined by considering the centre of the ball, in that if the centre of the ball is over the whole of the goal line by a distance greater than the radius of the ball, then a goal has been scored. To be clear, the position of the ball within the scene is actually determined by the position of the centre of the ball within the scene.

In the case that the whole of the ball is determined to have crossed the whole of the goal line, then a goal indication signal indicating that a goal has been scored is sent from the controller 204 to a wireless transceiver 206. The wireless transceiver then sends the goal indication signal wirelessly to a headset 208 worn by one of the match officials. The wireless signal is sent via a secure channel. It is advantageous to send the goal indication signal over a secure channel in order to prevent false signals being sent to the headset 208 from rogue sources (for example, other wireless transceivers in the possession of third parties attempting to dictate the result of a football match by sending false goal indication signals to the headset 208). The secure channel may be established during a handshaking authentication process between the headset 208 and wireless transceiver 206 prior to the start of the football match, for example.

It is noted that although FIG. 2 illustrates the camera calibration computers 202 as being separate to the controller 204, it would be equally acceptable for the camera calibration computers 202 to instead be comprised within the controller 204. It would also be equally acceptable for the wireless transceiver 206 to be comprised within the controller 204.

Although the example of a headset 208 has been given, the wireless signal could also be sent to a different type of receiver, such as a watch or earpiece worn by a match official. There could also be a plurality of such receivers so that all match officials can simultaneously receive the goal indication signal.

The controller 204 could also be made to be operable to send more than just the goal indication signal. For example, in the case that a goal is scored or almost scored, the detected position of the ball within the scene could be rendered as a computerised image or video. Then, as well as the goal indication signal being sent to the match officials, the image or video could also be sent to television broadcasters for including in television coverage of a football match.

Although the system 200 has been described as processing only one set of captured images I1-I6, in embodiments, the system processes sequences of images captured by the cameras 100 at a predetermined frame rate. So, for example, images $I1_1$-$I6_1$ are captured at time $t_1$, images $I1_2$-$I6_2$ are captured at time $t_2$, images $I1_n$-$I6_n$ are captured at time $t_n$ and so on. This allows the position of the ball to be determined at times $t_1, t_2, \ldots, t_n$, and so on, so that the position of the ball may be tracked throughout the time that the ball is in play. Any predetermined frame rate could be used, although in embodiments, the frame rate is chosen to be high enough to accurately track the changing position of the ball but not so high as to cause any processing delay in the controller 204 (thus allowing the system to process the images in real time). For example, the frame rate could be 25, 30, 50, 60 or 100 frames per second per camera (corresponding to a total of 150, 180, 300, 360 or 600 frames per second for six cameras).

Figure 3:
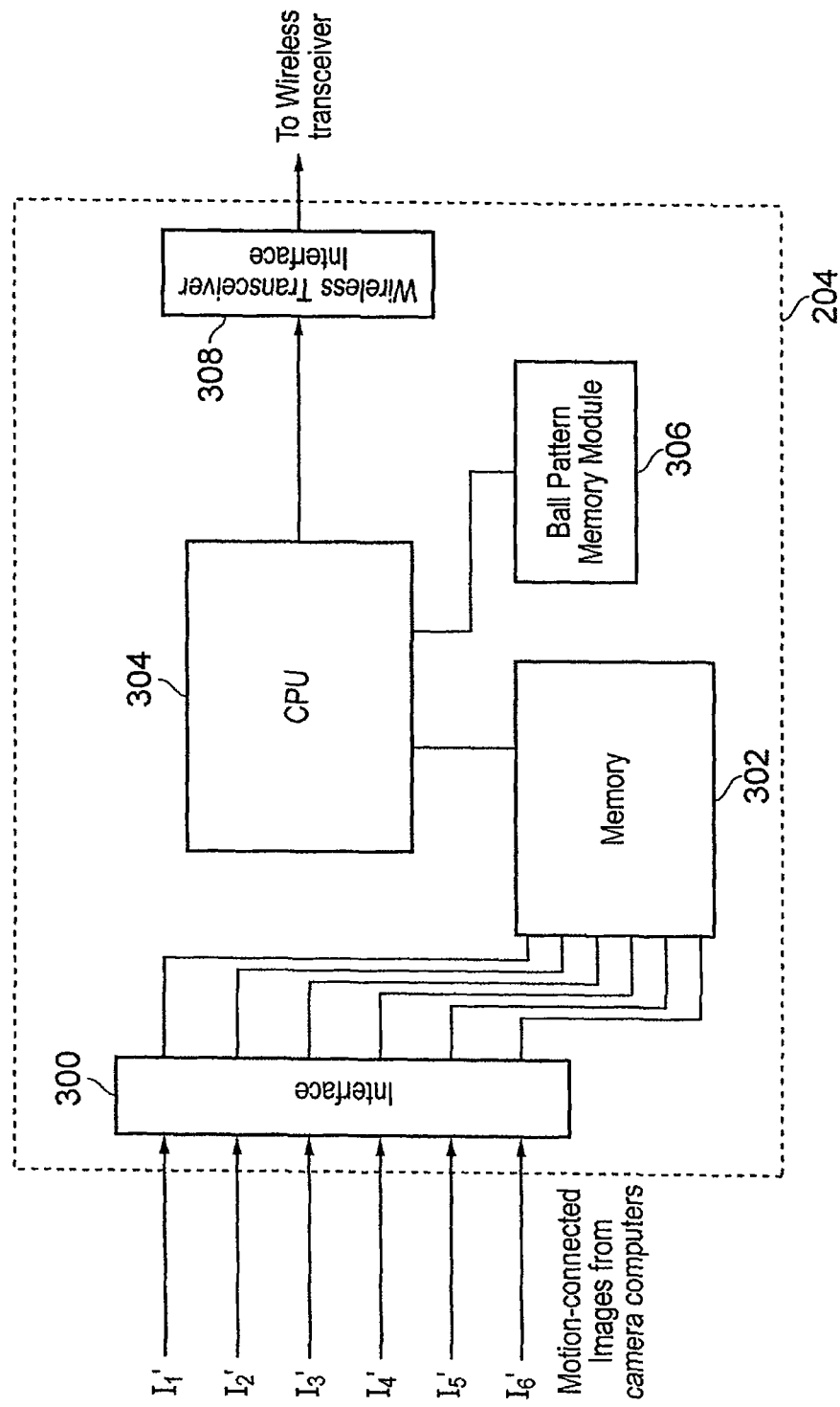
FIG. 3 schematically illustrates an apparatus for detecting the position of a ball within a scene in accordance with an embodiment of the invention.

FIG. 3 schematically illustrates the controller 204 in more detail in accordance with an embodiment of the invention. The controller 204 comprises an interface into which each of the corrected captured images I1'-I6' from the camera calibration computers 202 enters the controller 204. The images are stored in a memory 302. The controller 204 also comprises a CPU 304 for carrying out the required ball position and ball trajectory determination processing, a ball pattern memory module 306 for storing data indicative of the characteristic pattern of the ball's surface and a wireless transceiver interface through which the goal indication signal may be transmitted to the headset 208. As well as the images I1'-I6', the memory 302 may also store other sets of images captured by the cameras 100 at different times to when the images I1'-I6' were captured. The memory 302 may also store computer instructions to be executed by the CPU 304.

For detecting the position of the ball within the scene, each of the images I1'-I6' are processed by the CPU 304. The CPU 304 then attempts to identify at least a part of the ball in each image by finding sections of the image which match parts of the characteristic pattern of the ball's surface specified by the data in the ball pattern memory module 306. This may be achieved using a block matching technique, for example, although any suitable image processing method that is known in the art for selecting sections of an image that substantially match a predetermined pattern may be used.

If such a match occurs, then the CPU 304 determines position data for the matching section of the image. For example, this position data could be a list of the positions of the pixels defining the edge of the matching section within the image, the positions of the pixels being x and y coordinates determined with respect to a predetermined reference point in the image. The predetermined reference point could be, for example, one of the corners of the image. It could also be determined by the position of a predetermined object within the image.

The CPU 304 also determines orientation data for the ball in the image. This orientation data is based on the sections of the characteristic pattern of the ball's surface which are detected in the image, and as is explained later on, allows the CPU 304 to determine the position of the centre of the ball within the scene even if, for example, only a portion of the ball's surface is visible within the field of view of each of the cameras 100

The CPU 304 is able to determine the real-life position of the centre of the ball within the scene via the determined position and orientation data for the ball in each of the captured images I1'-I6' together with the relative positions of each of the cameras 100.

For each captured image of the scene, the CPU 304 converts the determined image position data for a matching section in the image to scene position data for the matching section within the scene. For example, if the image position data is defined by the pixel positions $(x_1, y_1)$, $(x_2, y_2)$, ..., $(x_n, y_n)$ then the corresponding scene position data will be the positions within the scene (real $x_1$, real $y_1$), (real $x_2$, real $y_2$), ..., (real $x_n$, real $y_n$). The positions within the scene will be defined with respect to the point within the scene that corresponds to the predetermined reference point within the image. For example, if the predetermined reference point within the image is defined by the position of a stationary object within the image, then the corresponding point within the scene will be the position of the object itself.

The image position data and the scene position data for an image will be related by a scaling ratio (for example, 0.5 cm in the scene equates to a pixel) which depends on various parameter settings for the camera which captured the image, such as the focal length and zoom of the camera. For example, for longer focal lengths and greater levels of zoom, the length of each of the pixels defining the image position data will correspond to smaller real distances within the scene than for shorter focal lengths and lesser levels of zoom, resulting in a smaller scaling ratio.

Once scene position data for each of the captured images I1'-I6' has been determined, the position of the ball within the scene is determined from the scene position data, the orientation data and the relative positions of the cameras 100. The relative positions and various parameter settings of each of the cameras 100 are stored in the memory 302 and may be appropriately altered for different camera positions and settings in different-sized football stadiums, for example. The relative positions of the cameras 100 may be defined, for example, by defining the position of a first camera to be an origin and defining the positions of all other cameras relative to this origin.

The relative positions of the cameras 100 must be made available to the CPU 304 in order for the CPU 304 to determine the 3-dimensional position of the ball within the scene from the 2-dimensional scene position data and orientation data for each of the cameras 100. For example, if a first camera is able to determine the position of the ball in a first coordinate system defined by parameters $(x_1, y_1)$ with respect to a first predetermined reference point and a second camera, positioned differently to the first camera, is able to determine the position of the ball in a second coordinate system defined by parameters $(x_2, y_2)$ with respect to a second predetermined reference point, then the CPU 304 can determine the 3-dimensional position of the camera only if it knows how the first and second coordinate systems are related. Since the relationship between the first and second coordinate systems is dictated by the relative positions of the cameras 100, the relative positions of the cameras 100 must be made available to the CPU 304 in order for the 3-dimensional position of the ball to be determined.

Although the example above is given for a simplified situation where the ball is not obscured from the view of any camera, the relative positions of the cameras 100 must also be made available to the CPU 304 in order for the CPU 304 to determine the position of the ball when the ball is partially obscured from view. This is because for each image within a captured set of images I1'-I6', the position data for the matching sections within the image will be defined in a coordinate system particular to the camera which captured the image. In order for the CPU 304 to determine the position of the ball within the scene from the position and orientation data, the relationship between the coordinate systems for each camera 100 must be made available to the CPU 304. Again, the relationship between the different coordinate systems is dictated by the relative positions of the cameras and hence the relative positions of the cameras must be made available to the CPU 304.

The CPU 304 may generate a number of confidence values when attempting to detect matching sections within an image. The confidence values could correspond to, for example, the colour of the ball, the shape of the ball or the pattern of the ball, and would allow the CPU 304 to focus the ball pattern detection processing on areas of the image where matching sections are likely to be found. For example, if the CPU 304 knows from the data stored within the ball pattern memory module 306 that the surface of the ball is largely white-coloured, then the CPU 304 may search only lighter-coloured sections of the image. Alternatively, the CPU 304 may determine certain colours which are not present on the surface of the ball, and thus avoid processing areas of the image in which these colours appear. This has the advantage of reducing the amount of processing required by the CPU 304 when finding matching sections within an image.

The CPU 304 may also focus the ball pattern detection processing on areas of each image in a set of images $I1_n'$-$I6_n'$ where the ball is likely to be based on the position of the ball in previously captured images which are stored in the memory 302. For example, if the ball is found at coordinates (x, y) in image $I1_{n-1}'$ captured at time $t_{n-1}$ from a particular camera 100, then the CPU 304 may start searching for the ball pattern in a predetermined region which is in the vicinity of coordinates (x, y) in the next image $I1_n'$ captured at time $t_n$ by the particular camera 100. The determined position of the ball within at least one other image within the same set of images $I1_n'$-$I6_n'$, the at least one image being captured by a different camera 100, could also be used. Alternatively, any other suitable predictive image processing technique known in the art may be used. Again, this has the advantage of reducing the amount of processing required by the CPU 304 when finding matching sections within an image, as an intelligent starting point is selected. Also, the position of the ball will be detected more quickly.

The CPU 304 may also eliminate noise and/or false balls from each of the images using, for example, the confidence values, or using any other suitable method that is known in the art. Such methods could involve using data from just a single image, or could involve using data from a plurality of images. The plurality of images could include images within the same set $I1_n'$-$I6_n'$, or could include images in different sets captured at different times.

For determining the trajectory (sometimes referred to as the velocity as velocity includes speed and direction) of the ball within the scene during time intervals in which the ball is hidden from the view of all cameras, a first sequence of images is captured by the cameras 100 at a first predetermined frame rate immediately before the time interval over which the ball is hidden. This first sequence of images is stored in the memory 302. A second sequence of images is then captured by the cameras 100 at a second predetermined frame rate immediately after the time interval over which the ball is hidden. This second sequence of images is then also stored in the memory 302. For each separate set of images $I1_n'$-$I6_n'$ captured at time $t_n$ and stored in the memory 302, the position of the ball within the scene is determined by the CPU 304 in accordance with that described previously.

The CPU 304 then determines the speed and direction of the ball immediately before the time interval over which the ball is hidden using the determined position of the ball for each set of images $I1_n'$-$I6_n'$ within the first sequence of images, together with the first predetermined frame rate. Also, the CPU 304 determines the speed and direction of the ball immediately after the time interval over which the ball is hidden using the determined position of the ball for each set of images $I1_m'$-$I6_m'$ within the second sequence of images, together with the second predetermined frame rate. For example, for a sequence of images, the CPU 304 may determine the speed of the ball at a time $t_n$ when a set of images $I1_n'$-$I6_n'$ is captured by calculating the difference between the position of the ball within the scene determined from the set of images $I1_n'$-$I6_n'$ captured at time $t_n$ and the position of the ball within the scene determined from the previous set of images $I1_{n-1}'$-$I6_{n-1}'$ captured at time $t_{n-1}$. The CPU 304 then divides this difference by the time interval $t_n - t_{n-1}$ which, for consecutively captured images sets, is equal to the reciprocal of the predetermined frame rate.

The speed and direction of the ball may also be referred to collectively as the velocity of the ball.

Using impact characteristic data for the ball in conjunction with the determined velocities before and after the time interval over which the ball is hidden, the CPU 304 may determine the position of the ball during this time interval. Impact characteristic data is stored in the memory 302, and includes any data useful for modelling the trajectory of the ball in the case that the ball experiences an impulse whilst it is hidden (for example, if it hits the goal post or is kicked). The impact characteristic data could comprise, for example, the pressure to which the ball is inflated, information on the aerodynamics of the ball or how the elastic properties of the material from which the ball is constructed change at different temperatures and in different weather conditions. The impact characteristic data is determined experimentally from the match ball prior to the start of the football match and importantly indicates the amount of deformation experienced by the ball for a given force of impact for any given time after the impact.

The hidden ball trajectory detection may occur automatically for time intervals over which the CPU 304 determines that the ball is not visible. Then, in the case that the determined trajectory shows the whole of the ball to have crossed the whole of the goal line, the goal indication signal may be sent to the headset 208. Alternatively, to reduce the amount of processing, the hidden ball trajectory detection may be initiated manually in cases where the ball becomes hidden whilst very close to the goal line. Such a manual approach is possible, since sets of corrected captured images $I1_n'$-$I6_n'$ that are captured at a predetermined frame rate may be stored in the memory 302 for a predetermined period of time, such as 30 seconds, so as to be available should they be required.

The data comprised within the ball pattern memory module 306 which is indicative of the characteristic pattern of the ball's surface may be changed or updated for footballs with a different characteristic pattern (for example, for ordinary and high-visibility patterned footballs). Further different manufacturers have different ball designs. Therefore, for any number of different balls and ball designs, a library of ball patterns is stored within the memory module 306. This change or update could occur, for example, by the ball pattern memory module 306 being a physically removable and replaceable memory module or by the ball pattern memory module 306 being operable to receive new or updated data electronically from an external source, such as an external computer (not shown). In the case that the ball pattern memory module 306 is operable to receive new or updated data electronically, this could occur by either a wired or wireless connection between the external source and the ball pattern memory module 306.

In order for the memory 302 to be updated with data indicative of, for example, the positions of the cameras 100, the various parameters of the cameras 100 and the impact characteristic data for the ball, it is necessary for the controller 204 to have a user interface (not shown) in order for such data to be input to the controller 204. The user interface could comprise, for example, a traditional display, keyboard and mouse, or a touch screen interface. Since whether or not a goal is scored is determined by the CPU 304 on the basis of whether or not the centre of the ball is over the whole of the goal line by a distance greater than the radius of the ball, in embodiments, data indicative of the radius of the ball is comprised within either the memory 302 or the ball pattern memory module 306 of the controller 204.

Figure 4A:
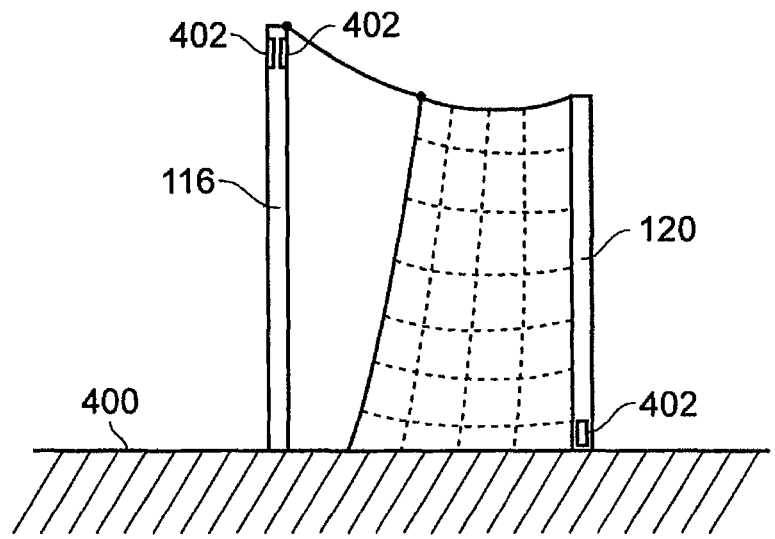
FIG. 4A schematically illustrates the positions of camera calibration reference markers in accordance with an embodiment of the invention.
Figure 4B:
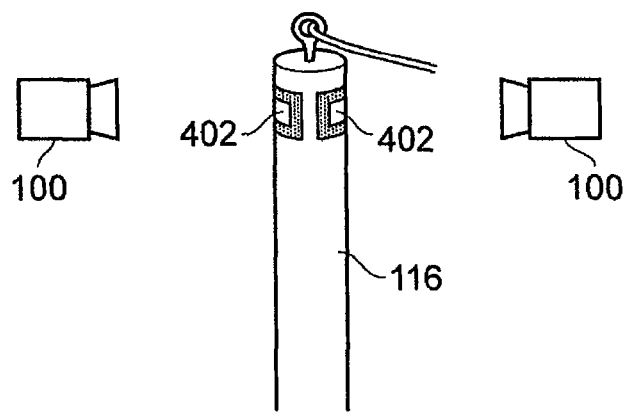
FIG. 4B schematically illustrates a first possible position of camera calibration reference markers in accordance with an embodiment of the invention.
Figure 4C:
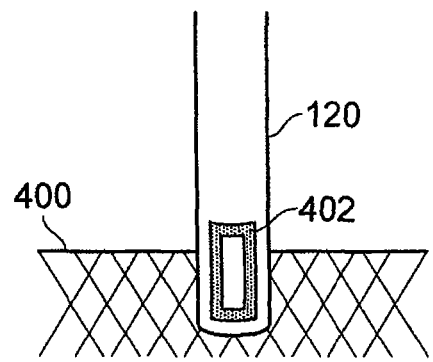
FIG. 4C schematically illustrates a second possible position of camera calibration reference markers in accordance with an embodiment of the invention.

FIGS. 4A-4C schematically illustrate the positions of the camera calibration reference markers in accordance with one embodiment of the invention.

FIG. 4A schematically illustrates a view from the side of the goal. Camera calibration reference markers 402 are placed at or near the top of each of the goal net supports 116 and at the bottom of each of the goalposts 120. The reference markers 402 could be placed in different locations. However, it is important that such locations are chosen so that the reference markers 402 are stationary within the scene, so that any change in the position of a reference marker 402 between one captured image and the next is due to the movement of the camera 100 rather than the movement of the reference marker. Each of the reference markers 402 is positioned so as to be clearly visible to at least one of the cameras 100 (that is, visible to at least one camera 100 to the extent that the camera calibration computer 202 may reliably detect the location of the reference marker 202).

In one embodiment, each of the cameras 100 should be able to clearly view a plurality of reference markers 402 so that camera motion can be effectively offset in the captured images even if the camera's view of one or more of the reference markers 402 becomes obscured. For example, the reference markers 402 and cameras 100 could be positioned such that each camera 100 is able to view one reference marker 402 at the bottom of the goal post 120 and one reference marker 402 on each of the goal net supports 116. Indeed, by placing the reference markers 402 at the top of each of the goal net supports 116, the likelihood of a reference marker 402 moving between captured images or becoming obscured is very small.

FIG. 4B schematically illustrates a magnified view of the reference markers 402 at the top of one of the goal net supports 116. Two reference markers 402 are shown to be positioned so that each reference marker 402 is clearly within the field of view of a different camera 100 (for clarity, the cameras 100 are shown to be much closer to the reference markers than they would actually be). In one embodiment, a greater number of reference markers 402 can be positioned at the top of the goal net support 116 so as to each be within the field of view of a different camera 100.

FIG. 4C schematically illustrates a magnified view of a reference marker 402 at the bottom of one of the goal posts 120. The reference marker 402 is seen in FIG. 4C from a frontal perspective. Each of the reference markers 402 corresponding to a particular camera 100, wherever they are located, should be orientated so as to be seen from a substantially frontal perspective in the camera's field of view. This makes it easier for the camera calibration computer 202 connected to a camera 100 to detect the position of the reference marker 402. As with FIG. 4B, in a preferred embodiment, a greater number of reference markers 402 than is shown can be positioned at the bottom of the goal net support 116 so as to each be within the field of view of a different camera 100.

As illustrated in FIGS. 4A-4C, in one embodiment, the reference marker 402 is a rectangular shape consisting of a light-coloured inner rectangle with a dark-colour rectangular border. This makes detecting the position of the reference marker 402 in each image easier as there is a distinct pattern to the marker. Further, in order to more easily capture the reference marker 402 in each image, the reference marker 402 may also be made fluorescent and/or reflective. Positioning the reference markers 402 at the top of the goal net holders 116 and at the bottom of the goal posts 120 is preferable since, unlike other parts of the goal frame, these parts generally experience very little movement during the course of a football match.

Figure 5A:
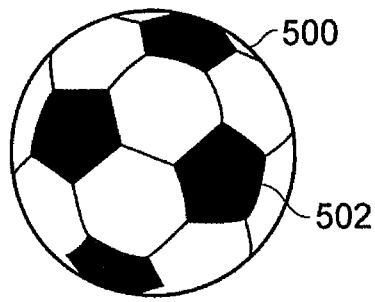
FIG. 5A schematically illustrates a ball with a characteristic pattern on its surface.

FIG. 5A schematically illustrates a football 500 with a characteristic pattern 502 on its surface. In this particular example, the pattern 502 consists of dark-coloured hexagonal shapes on a light-coloured background. Data indicative of the characteristic pattern 502 is comprised with the ball pattern module 306.

Figure 5B:
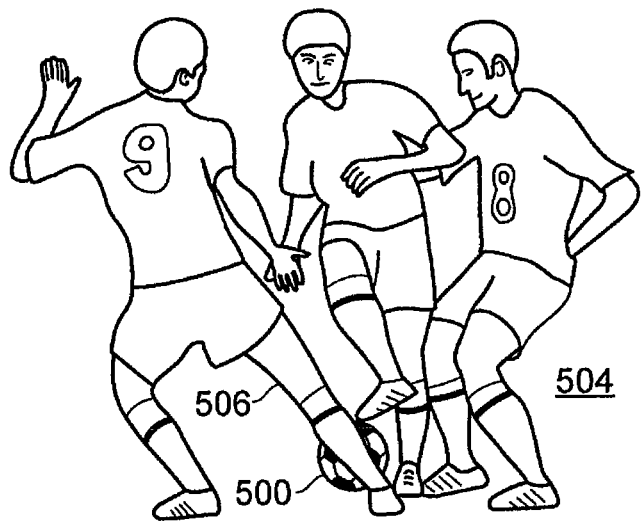
FIG. 5B schematically illustrates an image of a scene in which only a portion of the ball illustrated in FIG. 5A is visible.

FIG. 5B schematically illustrates a scene 504 during a football match in which the football 500 is partially obscured from view by an obstacle 506 (in this case, the obstacle is a football player's leg). In the case that an image of the scene is captured by a camera 100, is correctively offset by the camera calibration computer 202 connected to the camera and is then sent to the controller 204, the CPU 304 within the controller will process the image to find position and orientation data for the ball within the image based on the data indicative of the characteristic pattern 502 of the ball stored within the ball pattern memory module 306, as previously described.

Figure 5C:
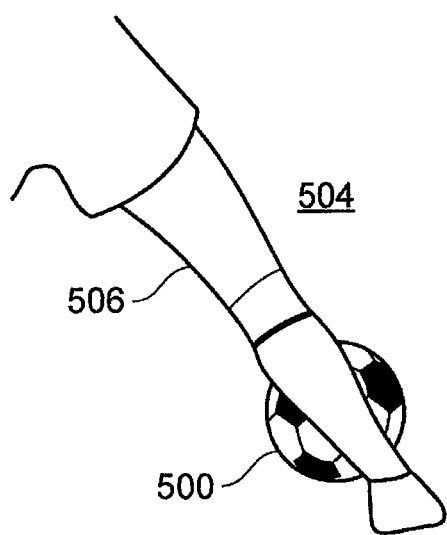
FIG. 5C schematically illustrates the determination of the position of the centre of the ball in the scene illustrated in FIG. 5B in accordance with an embodiment of the invention.
Figure 5C:
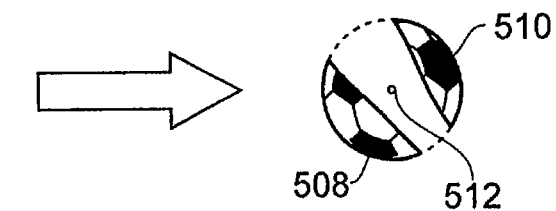

FIG. 5C schematically illustrates a magnified view of the scene 504 which includes the ball 500 and the obstacle 506. FIG. 5C also shows sections 508, 510 of the image of the scene which match the characteristic pattern 502 of the ball and which are hence detected by the CPU 304. These matching sections 508, 510 correspond to the ball within the image of the scene. In many cases, where the obstacle 506 is larger, only a single one of the matching sections 508, 510 may be visible and hence detectable by the CPU 304.

Further, over the duration of the match, the lighting conditions change within the scene. These changes in lighting may result in the colours of the ball becoming darker or lighter. Indeed, if the pitch has artificial lighting switched on during the match, the colour of the ball may become lighter and have a whitened area where the artificial lights reflect off of the ball. In order to account for this, the characteristic pattern 502 of the ball stored in the memory module 306 has a lighting algorithm applied thereto to correct for these changes. Such algorithms are known in the art of image processing and so will not be described hereinafter.

As previously described, the CPU 304 is able to use the determined position and orientation data for the ball within each image within a set of images $I1_n'$-$I6_n'$ to determine the real-life position of the centre 512 of the ball 500 within the scene.

Figure 6A:
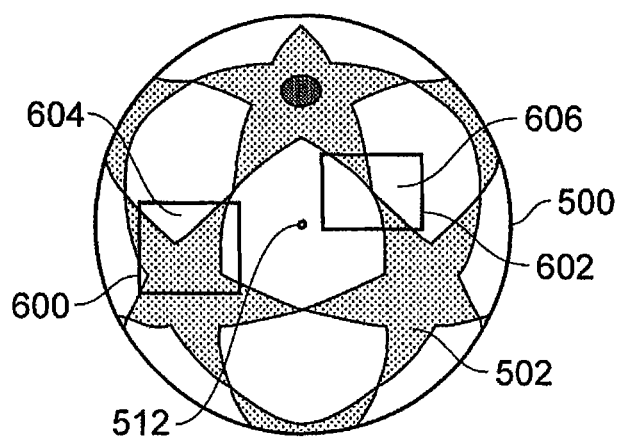
FIG. 6A schematically illustrates two viewable sections of a ball with a characteristic pattern on its surface.
Figure 6B:
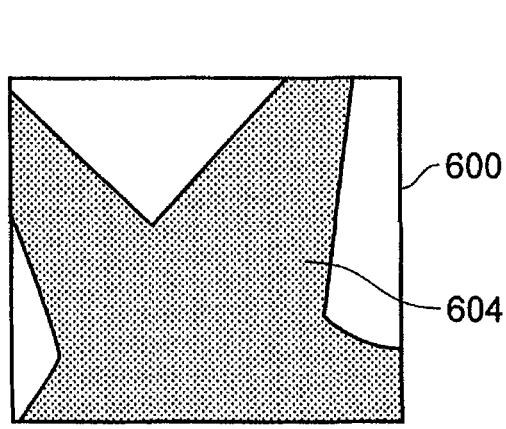
FIG. 6B schematically illustrates a magnified view of the first viewable section of FIG. 6A, the first viewable section comprising first orientation data in accordance with an embodiment of the invention.
Figure 6C:
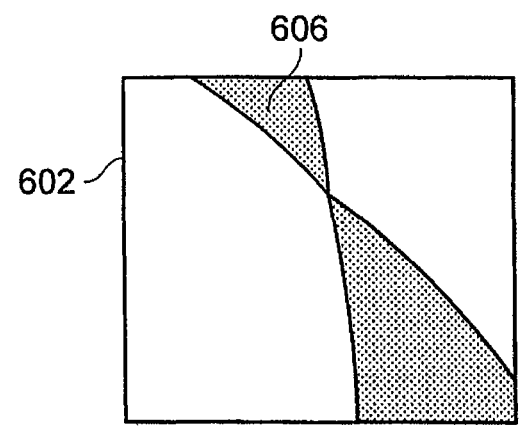
FIG. 6C schematically illustrates a magnified view of the second viewable section of FIG. 6A, the second viewable section comprising second orientation data in accordance with an embodiment of the invention.

FIGS. 6A-6C schematically illustrate an example of orientation data for an image of a ball within a scene. FIG. 6A again shows the football 500 with a characteristic pattern 502. Viewable sections 600 and 602 are shown, each comprising the characteristic pattern sections 604 and 606, respectively. It will be assumed that for a particular image of the scene within a captured set of images $I1_n'$-$I6_n'$, the viewable sections 600, 602 are the only visible sections of the ball within the image. In accordance with that already described, the characteristic pattern sections 604 and 606 within the viewable sections 600, 602 are detected by the CPU 304 and position data for each of the viewable sections 600, 602 is determined. In this example, the characteristic pattern sections 604 and 606 constitute the orientation data for the ball 500 within the image.

FIGS. 6B and 6C schematically show magnified views of the viewable sections 600 and 602, respectively. The CPU 304 maps each of the characteristic pattern sections 604, 606 to the corresponding portions of the data indicative of the characteristic pattern 502 stored within the ball pattern memory module 306. In combination with the position data for each of the viewable sections 600, 602, the CPU 304 then has sufficient information to determine the position of the centre 512 of the ball 500 within the image. This is because, given the position data for each of the viewable sections 600 and 602 within the image, only one position of the centre 512 of the ball 500 is able to provide the specific characteristic pattern sections 604 and 606 within each of the respective viewable sections 600 and 602.

For simplicity, FIGS. 6A-6C illustrate how the CPU 304 determines the position of the centre of the ball within a single image within a captured set of images $I1_n'$-$I6_n'$ using position and orientation data for the ball within that image only. It would not, however, be possible to determine the 3-dimensional position of the centre of the ball within the scene for a single image, since the captured image itself is only 2-dimensional. Furthermore, if, for example, only the viewable section 600 was viewable within the captured image, then it would be very difficult for the CPU 304 to accurately determine the position of the centre of the ball within the scene, since there are likely to be multiple positions of the ball which provide substantially the characteristic pattern section 604 within the viewable section 600.

In reality, the CPU 304 is therefore operable to use position and orientation data for the ball for every image within a captured set of images $I1_n'$-$I6_n'$, together with the positions and various parameter settings of the cameras 100, to determine the 3-dimensional position of the centre of the ball within the scene. For example, if there exists a first viewable section with a first characteristic pattern section in a first image together with a second viewable section with a second characteristic pattern section in a second image, then the CPU 304 is operable to determine the position of the centre of the ball within the scene on the basis of the position data and characteristic pattern section for each of the first and second viewable sections using the same principle as that described in FIGS. 6A-6C. Because two separate images (from two separate cameras) have been used, it is possible to determine the 3-dimensional position of the centre of the ball within the scene.

Figure 7:
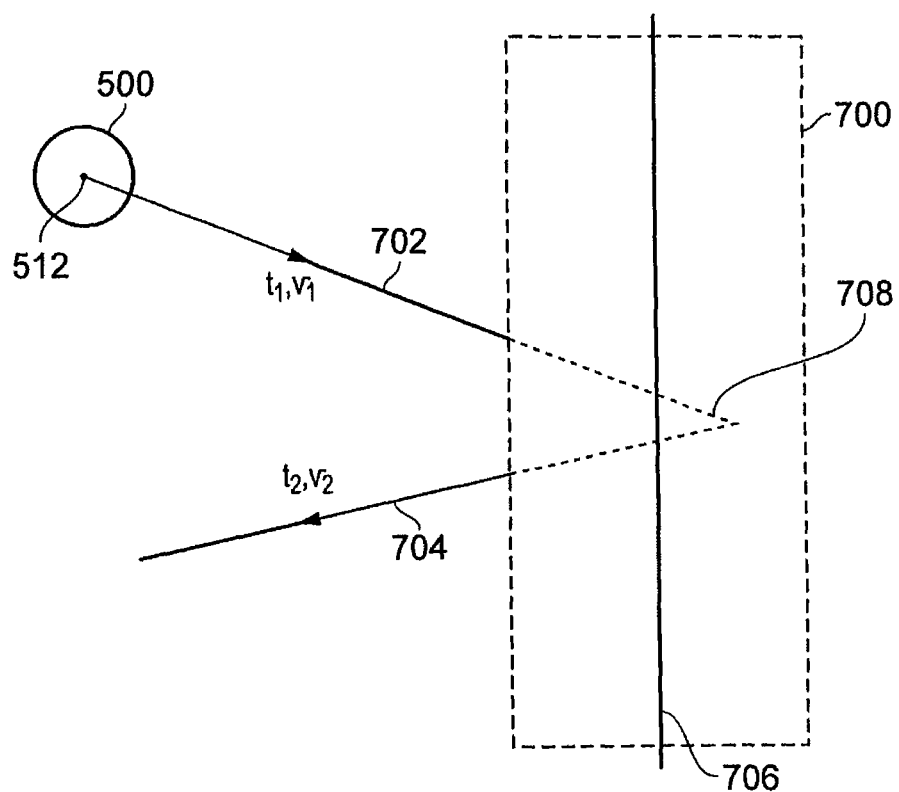
FIG. 7 schematically illustrates the computed trajectory a ball during a time interval over which the ball becomes hidden from the view of a camera in accordance with an embodiment of the invention.

FIG. 7 schematically illustrates a trajectory of the ball determined by the CPU 304 during a time interval over which the ball becomes hidden from the view of the cameras 100. The ball is considered to be hidden at a time $t_n$ when the position of the ball within the scene cannot be accurately determined by the CPU 304 from a set of images $I1_n'$-$I6_n'$ captured by the cameras 100 at time $t_n$. For example, the ball may be surrounded by a large number of obstacles so that no part of the ball may be visible to any of the cameras 100. Alternatively, the ball may only be visible to a single camera 100, in which case, the CPU 304 is not provided with sufficient position and orientation data to determine the position of the ball within the scene.

FIG. 7 illustrates the ball 500 with centre 512 entering the hidden region 700 via the incoming trajectory 702 and leaving the hidden region 700 via the outgoing trajectory 704. The CPU 304 is able to determine the velocity $v_1$ of the ball at time $t_1$ immediately before it becomes hidden in the hidden region 700 and the velocity $v_2$ of the ball at time $t_2$ immediately after it has been hidden in the hidden region 700, as previously described. The CPU 304 is then able to determine the hidden trajectory 708 of the ball within the hidden region 700 using at least one of the detected position of the ball within the scene at times $t_1$ and $t_2$, the determined velocity of the ball at times $t_1$ and $t_2$ and the impact characteristic data for the ball stored in the memory 302.

In the example of FIG. 7, the goal line 706 is within the hidden region 700. The hidden trajectory 708 determined by the CPU 304 shows that the centre 512 of the ball 500 crossed the goal line 708 during the time interval over which the ball was hidden and therefore a goal has been scored. Embodiments of the present invention therefore make it possible to determine whether or not the ball has crossed the goal line even during time intervals over which the ball is hidden from the view of the cameras 100.

By knowing the accelerations, velocities, positions and relative time for the incoming and outgoing trajectory, the system is able to interpolate the position/time information by calculating the force acting on the ball during the change of trajectory. By knowing the force acting on the ball one can calculate the compression on the ball and the position/time of the object which came in to contact with the ball.

So, if prior to becoming hidden the ball is travelling with a velocity v1, the angle of trajectory and the speed of the ball is known. If, after the ball is seen again, the ball is travelling with a velocity v2, the angle of the trajectory and speed of the ball is known. As there is assumed to be a force applied to ball during the hidden period (either because the ball deflects off an object, or because a player kicks the ball, for example), so that the ball can travel with velocity v2, the position at which the force is applied is assumed to be the furthest distance travelled by the ball.

As the change in velocity experienced by the ball is as a result of a force being applied to the ball, it is possible to calculate the force applied to the ball. Additionally, as velocity v2 (that is speed and direction) of the ball is known, it is possible to extrapolate when the force was applied to the ball. Accordingly, the furthest position of the ball can be calculated.

Additionally, by knowing the compression of the ball, it is possible to further establish when the force was applied to the ball. For example, if the force was applied just before the ball became visible again, the ball will appear deformed due to the application of the force. However, if the force was applied just after the ball became hidden, the ball would have regained more of its shape and so would look less deformed. The amount the ball is deformed is calculated in accordance with the pressure of the ball (and any other relevant impact characteristics) and the force applied to the ball.

Figure 8:
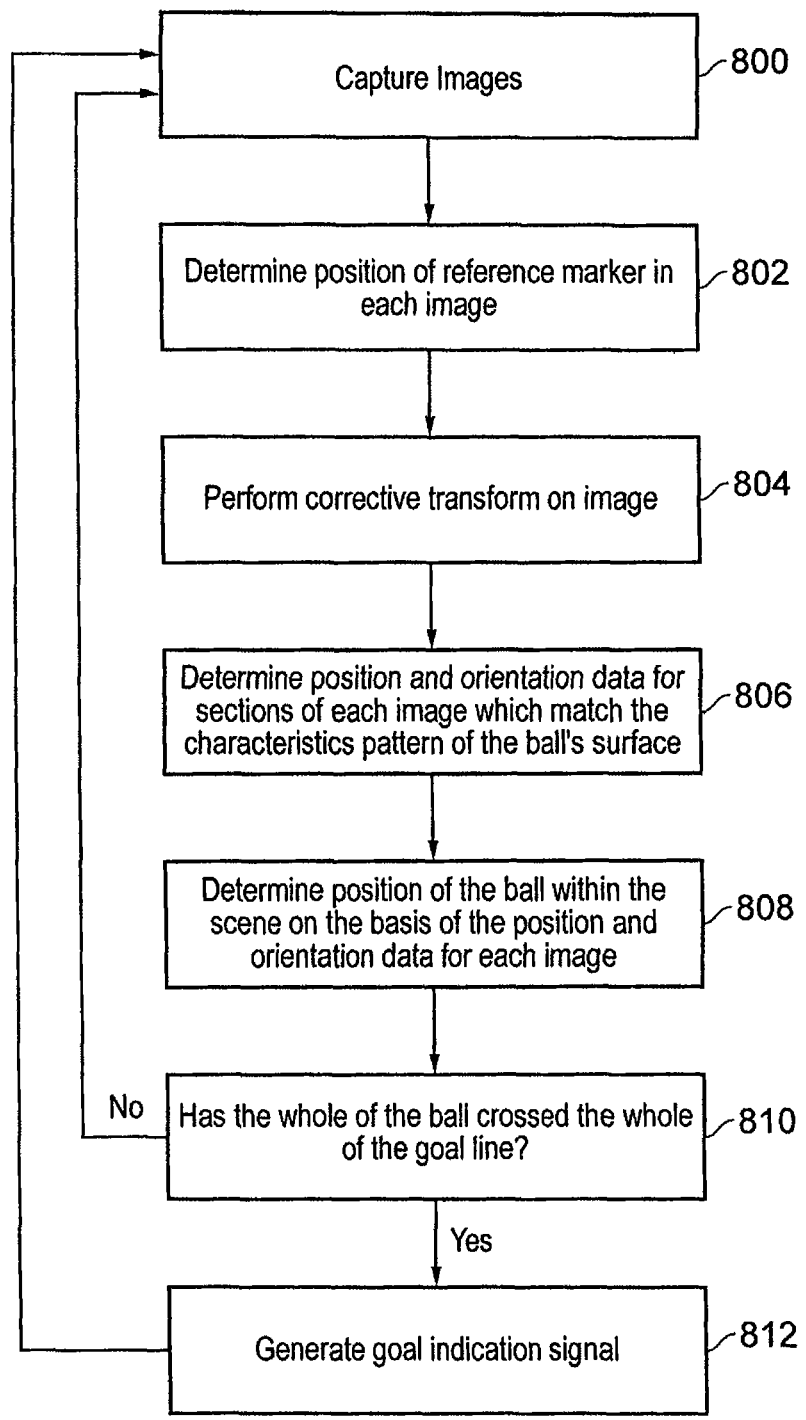
FIG. 8 schematically illustrates the operation of a system for determining the position of a ball within a scene in accordance with an embodiment of the invention.

A brief description of the operation of the system will now be described in accordance with FIG. 8. During the game, the cameras 100 all capture images from a different field of view of the goal, as shown in step 800. The cameras 100 also capture the reference markers 402 located at the base of the goal post and the top of the goal net supports 116. For each image, the position in the image of at least one of the reference markers 402 is determined, as shown in step 802. As the reference markers 402 are deemed to be in a fixed position within the scene, any movement of the reference markers 402 between consecutive images is due to movement of the cameras 100. At step 804, the difference in position between the at least one reference marker 402 captured by each camera 100 in consecutive images is used to determine a movement transform. In other words, as the movement of the reference markers 402 in the image is due to movement of the camera 100, all the other pixels in the captured image are moved by the same amount. Therefore, the position of each pixel in the captured image has the movement transform applied thereto.

After the movement transform has been applied to each pixel, sections of each image which match the characteristic pattern of the ball's surface are detected, and position and orientation data for each of these matching sections is determined, as shown in step 806. The position and orientation data for each image is then used to determine the position of the ball within the scene, as shown in step 808. The detection of the matching sections, the determination of the position and orientation data for the matching sections and the subsequent determination of the position of the ball within the scene is explained with reference to FIGS. 3 and 5A-6C.

In step 810, it is decided, from the determined position of the ball within the scene, whether or not the whole of the ball has crossed the whole of the goal line. In the case that the whole of the ball is deemed to have crossed the whole of the goal line, then a goal indication signal is generated, as shown in step 812. This goal indication signal is then sent to the headset of the match official.

Although the foregoing has been described with reference to goal lines, the invention is not so limited. Specifically, in embodiments, the match official could have an indication of the ball crossing any line within the field of play such as a throw in line, or a goal kick line or the like.

Although the foregoing has been explained with reference to balls, any type of sporting projectile such as a shuttlecock or ice hockey puck is envisaged.

In so far as the embodiments of the invention described above are implemented, at least in part, using software-controlled data processing apparatus, it will be appreciated that a computer program providing such software control and a transmission, storage or other medium by which such a computer program is provided are envisaged as aspects of the present invention.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A camera movement correction apparatus for use in a system which detects a position of a sporting projectile within a scene, the apparatus comprising:
   circuitry configured to:
   receive a first image of the scene and a second image of the scene captured by a camera;
   determine a position of a reference marker within the first image of the scene and a position of the reference marker within the second image of the scene, the reference marker being static within the scene;
   determine a difference between the position of the reference marker in the first image of the scene and the position of the reference marker in the second image of the scene; and
   apply a corrective transform, that corrects for the difference between the position of the reference marker in the first image of the scene and the position of the reference marker in the second image of the scene, to pixels of the second image of the scene to create a corrected second image of the scene on the basis of said determined difference.

2. The camera movement correction apparatus according to claim 1, wherein the corrective transform corrects for movement of the camera.

3. A system for detecting a position of a ball within the scene, the system comprising:
   the camera movement correction apparatus according to claim 1;
   the camera operable to capture the first image of the scene and the second image of the scene and provide the first image of the scene and the second image of the scene to the camera movement correction apparatus; and
   the reference marker positioned within the scene within a field of view of the camera.

4. The system according to claim 3, wherein the reference marker is configured to be seen from a substantially frontal perspective within the field of view of the camera.

5. The system according to claim 3, wherein at least a portion of the reference marker is reflective.

6. The system according to claim 3, wherein the scene comprises a goal post and the reference marker is placed on the goal post close to an end of the goal post which is in contact with the ground.

7. The system according to claim 3, wherein the scene comprises a goal net holder and the reference marker is placed on the goal net holder at a predetermined height above the ground.

8. The system according to claim 3, further comprising a casing around the camera, the casing configured to deflect wind from the camera.

9. The system according to claim 3, further comprising:
   a controller including circuitry configured to:
   receive the corrected second image of the scene, and determine the position of the ball within the scene based upon the corrected second image of the scene.

10. A camera movement correction method when capturing a scene in which a position of a sporting projectile is to be determined, the method comprising:
    receiving a first image of the scene and second image of the scene captured by a camera;
    determining a position of a reference marker within the first image of the scene and a position of the reference marker within the second image of the scene, the reference marker being static within the scene;
    determining a difference between the position of the reference marker in the first image of the scene and the position of the reference marker in the second image of the scene; and
    applying a corrective transform, that corrects for the difference between the position of the reference marker in the first image of the scene and the position of the reference marker in the second image of the scene, to pixels of the second image of the scene to create a corrected second image of the scene on the basis of said determined difference.

11. The method according to claim 10, further comprising;
    capturing the first image of the scene and the second image of the scene and providing the first image of the scene and the second image of the scene to a camera movement correction apparatus; and
    positioning the reference marker within the scene within a field of view of the camera.

12. The method according to claim 11, wherein the reference marker is configured to be seen from a substantially frontal perspective within the field of view of the camera.

13. The method according to claim 11, wherein at least a portion of the reference marker is reflective.

14. The method according to claim 11, wherein the scene comprises a goal post and the reference marker is placed on the goal post close to an end of the goal post which is in contact with the ground.

15. The method according to claim 11, wherein the scene comprises a goal net holder and the reference marker is placed on the goal net holder at a predetermined height above the ground.

16. The method according to claim 11, wherein the camera includes a casing configured to deflect wind from the camera.

17. The method according to claim 11, further comprising:
    receiving the corrected second image of the scene, and determining the position of the ball within the scene based upon the corrected second image of the scene.

18. The method according to claim 10, wherein the corrective transform corrects for movement of the camera.

19. A non-transitory computer program product containing computer readable instructions which, when loaded onto a computer, cause the computer to perform the method according to claim 10.

* * * * *